United States Patent
Feigel

(10) Patent No.: US 6,309,030 B1
(45) Date of Patent: Oct. 30, 2001

(54) PRESSURE CONTROL VALVE

(75) Inventor: Hans-Jörg Feigel, Rosbach (DE)

(73) Assignee: Continental Teves AG & Co., oHG, Frankfurt (DE)

( * ) Notice: Subject to any disclaimer, the term of this patent is extended or adjusted under 35 U.S.C. 154(b) by 0 days.

(21) Appl. No.: 09/381,065

(22) PCT Filed: Mar. 6, 1998

(86) PCT No.: PCT/EP98/01337

§ 371 Date: Dec. 30, 1999

§ 102(e) Date: Dec. 30, 1999

(87) PCT Pub. No.: WO98/40259

PCT Pub. Date: Sep. 17, 1998

(30) Foreign Application Priority Data

Mar. 12, 1997 (DE) .............................................. 197 10 173

(51) Int. Cl.$^7$ .................................................. B60T 8/38
(52) U.S. Cl. .................... 303/113.1; 303/116.1; 303/116.2; 303/119.1; 303/119.2
(58) Field of Search ................ 303/113.1, 113.2, 303/117.1, 119.1, 119.2; 251/129.02, 129.06, 129.07, 321, 129.15, 129.2; 137/625, 625.4, 607, 596.17

(56) References Cited

U.S. PATENT DOCUMENTS

| | | | |
|---|---|---|---|
| 3,582,039 | * 6/1971 | Cagle | 251/129 |
| 4,130,322 | * 12/1978 | Cook | 303/93 |
| 4,198,102 | * 4/1980 | DeVlieg | 303/92 |
| 4,635,852 | * 1/1987 | Muhlnickel | 239/414 |
| 4,809,742 | * 3/1989 | Grau | 137/554 |
| 5,109,886 | * 5/1992 | Takata | 137/596.17 |
| 5,191,827 | * 3/1993 | Kervagoret | 91/433 |
| 5,445,447 | * 8/1995 | Farr et al. | 303/117.1 |
| 5,667,285 | * 9/1997 | Seetharaman et al. | 303/116.2 |
| 5,678,902 | * 10/1997 | Farr et al. | 303/117.1 |
| 6,086,165 | * 7/2000 | Fujioka | 303/119.2 |
| 6,092,781 | * 7/2000 | Hohl | 251/129.02 |
| 6,145,540 | * 11/2000 | Linkner, Jr. | 137/625.65 |
| 6,148,859 | * 11/2000 | Fuller | 137/625.65 |
| 6,155,654 | * 12/2000 | Oyama | 303/117.1 |

FOREIGN PATENT DOCUMENTS

| | | |
|---|---|---|
| 29 44 706 | 5/1981 | (DE). |
| 39 35 395 | 6/1990 | (DE). |
| 41 41 354 | 6/1993 | (DE). |
| 44 43 373 | 6/1995 | (DE). |
| 44 41 150 | 5/1996 | (DE). |
| 195 18 333 | 11/1996 | (DE). |
| 195 36 619 | 4/1997 | (DE). |
| 0 363 845 | 4/1990 | (EP). |
| 0 369 412 | 5/1990 | (EP). |
| 07 66 030 | 4/1997 | (EP). |
| 0452173 | * 10/1991 | (FR). |

\* cited by examiner

*Primary Examiner*—J. J. Swann
*Assistant Examiner*—David A. Divine
(74) *Attorney, Agent, or Firm*—Rader, Fishman & Grauer PLLC

(57) ABSTRACT

A multi-way pressure control valve for an electromagnetically actuatable multi-way control valve for slip-controlled hydraulic automotive vehicle brake systems, for providing a flow connection between at least one wheel brake and a high-pressure source or a low-pressure accumulator.

15 Claims, 3 Drawing Sheets

PRESSURE CONTROL VALVE

TECHNICAL FIELD

The present invention generally relates to electromagnetic control valves and more particularly relates to an electromagnetically actuatable multi-way control valve for slip-controlled hydraulic automotive vehicle brake systems, for providing a flow connection between at least one wheel brake and a high-pressure source or a low-pressure accumulator.

BACKGROUND OF THE INVENTION

A multi-way valve of this type is disclosed in German patent application No. 44 41 150, for example. The slide of this multi-way valve is displaced in an axial direction by way of an axially movable and electromagnetically adjustable tappet. When the ABS control detects a locking wheel, for example, this will activate an electromagnetic control device, i.e., current flows through a coil and causes displacement of an armature connected to the tappet so that the slide separates the high-pressure source from the wheel brake in terms of flow and, subsequently, the tappet opens a seat valve interposed between the wheel brake and the low-pressure accumulator.

Although the operation of the prior art multi-way valve is satisfactory, the valve is destined for use in a defined vehicle class with a determined braking pressure range. The size or the power of the electromagnetic drive which is necessary to actuate a seat valve is determined by the valve opening cross-section which, in turn, is dictated by the braking pressure range for different vehicles. The result is that a great number of differently dimensioned seat valves must be manufactured and kept at hand.

Generic European patent application No. 0 369 412 discloses an electromagnetically actuatable multi-way control valve for slip-controlled hydraulic automotive vehicle brake systems which includes a slide in a housing member whose first control edge that is effective as a variable orifice normally has a pressure fluid connection between a port of the high-pressure source and the port of a wheel brake which opens into the housing member remote from the slide. To this end, a central bore provided with an invariable orifice is arranged in the slide. The slide is configured as a flow control valve permitting adjustment of a constant pressure fluid flow between the high-pressure source and the wheel brake irrespective of the electromagnetic energization of a valve coil by the hydraulic control position of the slide. When the valve coil is energized electromagnetically, the slide is urged to adopt a position where the first control edge isolates the port of the high-pressure source from the port of the wheel brake, while second control edge on the slide opens a throttled connection between the port of the wheel brake and a port of a low-pressure accumulator by way of the central bore in the slide.

An object of the present invention is to provide a multi-way control valve of the type mentioned hereinabove which has very small overall dimensions and can be used on a great number of vehicle classes, that means when various braking pressure conditions prevail.

In a multi-way valve of the type mentioned hereinabove, this object is achieved by the present invention because a valve member which closes the valve between the wheel brake and the low-pressure accumulator is provided by the slide, and in the closed condition of this valve both front surfaces of the slide are acted upon by hydraulic medium to which the pressure prevailing on the wheel brake is applied and which may escape to the low-pressure accumulator when the seat valve is opened.

This achieves a pressure balance on both sides of the valve member according to the present invention so that the electromagnetic drive can be correspondingly reduced in dimensions. Also, the present invention renders it possible to use one single type of multi-way valve on various vehicle classes.

Favorably, the valve between the wheel brake and the low-pressure accumulator is a seat valve so that the slide is adapted to be urged against a sealing seat in order to achieve a pressure-tight separation between the wheel brake and the low-pressure accumulator, on the one hand, and a large and quickly attainable valve opening cross-section, on the other hand.

In a particularly preferred aspect of the present invention, the slide has a second control edge which, together with a corresponding second control edge on the housing member, provides a second variable throttle cross-section in the hydraulic connection between the wheel brake and the low-pressure accumulator. This renders it possible to maintain and adjust the pressure which is applied to the wheel brake during a pressure-maintaining phase.

It is preferred that the first and second control edges of the slide and the housing member are preferably so arranged that upon displacement of the slide in the direction of reducing the pressure on the wheel brake, initially, the first flow cross-section is closed before the second flow cross-section is opened. This permits passing through a pressure control phase where the pressure on the wheel brake can be increased or reduced by displacing the slide to a comparatively small degree.

In a particularly favorable fashion, the flow cross-sections limited by the control edge increase progressively when the slide movement is steady. The result is a very quick response to a change in position of the slide during a pressure control phase.

Further, it is proposed to configure the second control edge of the slide on the front surface of the slide facing the sealing seat so that the slide can be urged against the sealing seat with this second control edge. This ensures a reliable sealing towards the low-pressure accumulator during the normal braking operation, and the second control edge can open the flow cross-section immediately after its lifting from the sealing seat or form a slot-type seal in conjunction with the second control edge of the housing member. The second throttle cross-section can be opened by passing the second control edge.

The above-mentioned measures render it possible by way of the multi-way valve of the present invention to variably adjust a flow cross-section which permits quick initial braking, on the one hand, and a sensitively controlled volume dosing during anti-lock control operations, on the other hand. This is not done, as frequently occurs in prior art ABS multi-way valves, by a differently long maximum opening of the valve (pulse width modulation) but by a combination of pulse width modulation and pulse amplitude modulation (differently large valve openings). This could per se be effected by a force adjustment, that means, by appropriately dimensioning the electromagnetic control device in relation to the resilient counterforce which acts upon the valve member of a seat valve. However, a valve which can be used on several vehicle classes is favorably achieved by the design of the multi-way valve according to the present invention wherein a position control circuit for the valve slide is additionally provided. The slide position of the sensor can then be determined in an advantageous manner by way of an electronic sensor device and is controllable by way of an electronic control device. This permits eliminating disturbing friction forces by the control, and the switching condition of the multi-way valve, that means the position of the slide, is known at any time. This renders it possible, in turn, to exactly predefine the speed of the variation of the opening cross-section. As it was found out that the variation of the pressure gradient is a major source of noises in multi-way valves of this type, the speed of the variation can be reduced to such an extent that the response times are still satisfactory and the noise which occurs during operation is still not disturbing. This is assisted by the above-mentioned progressive course of the opening cross-section which is achieved because the circular supply bore describes the opening surface. This type of regulation or control also eliminates the abutment noise of the armature which is produced during pulse width modulation. When the slide is moved in the direction of its first end position after deactivation of the ABS control, a preferably elastomeric sealing seat achieves a major damping effect when the slide is moved to bear against it.

DETAILED DESCRIPTION OF THE PREFERRED EMBODIMENTS

Figure 1:
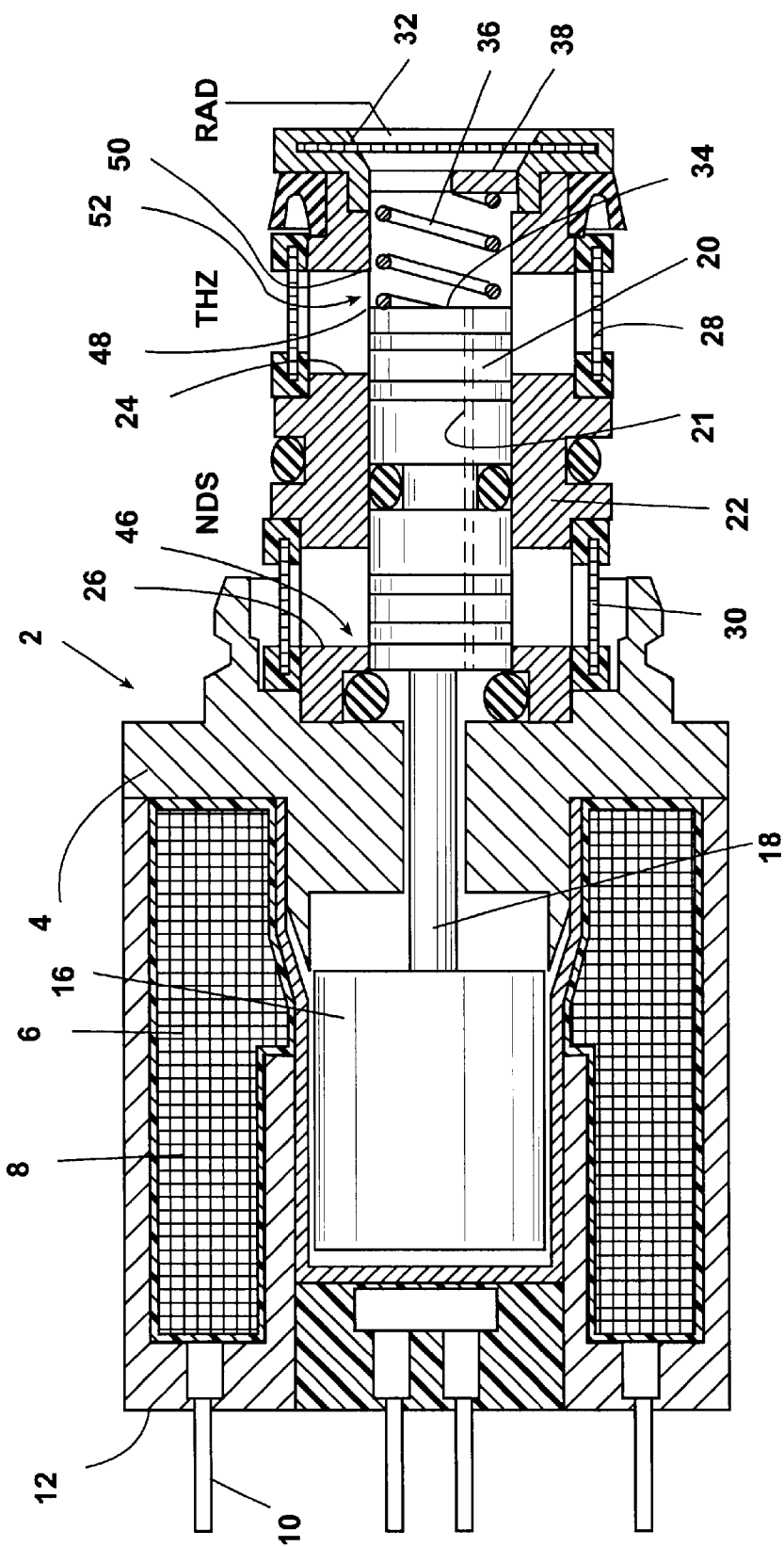
FIG. 1 is a cross-sectional view of the multi-way valve of the present invention in the normal braking operation.
Figure 2:
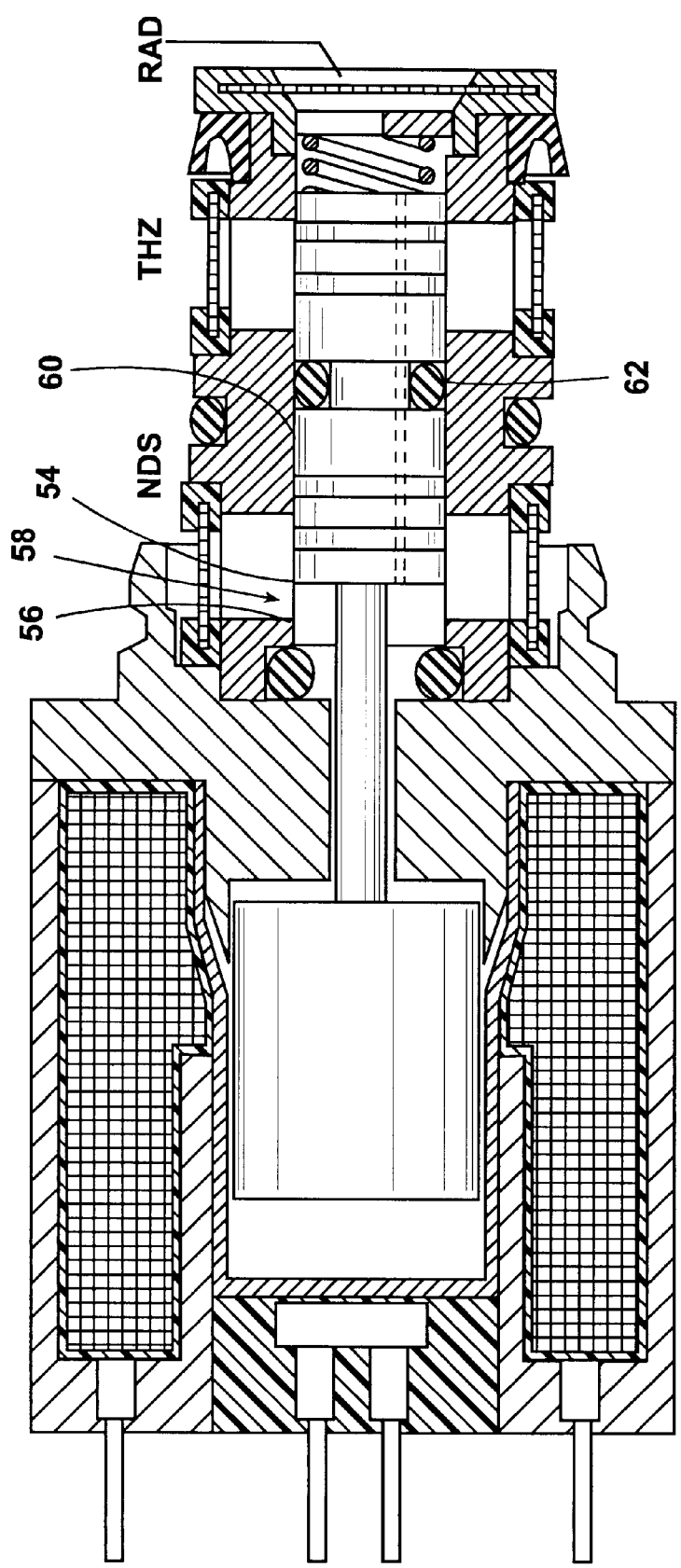
FIG. 2 is a cross-sectional view of the multi-way valve of the present invention as in FIG. 1 in the maximum pressure reduction operation.
Figure 3:
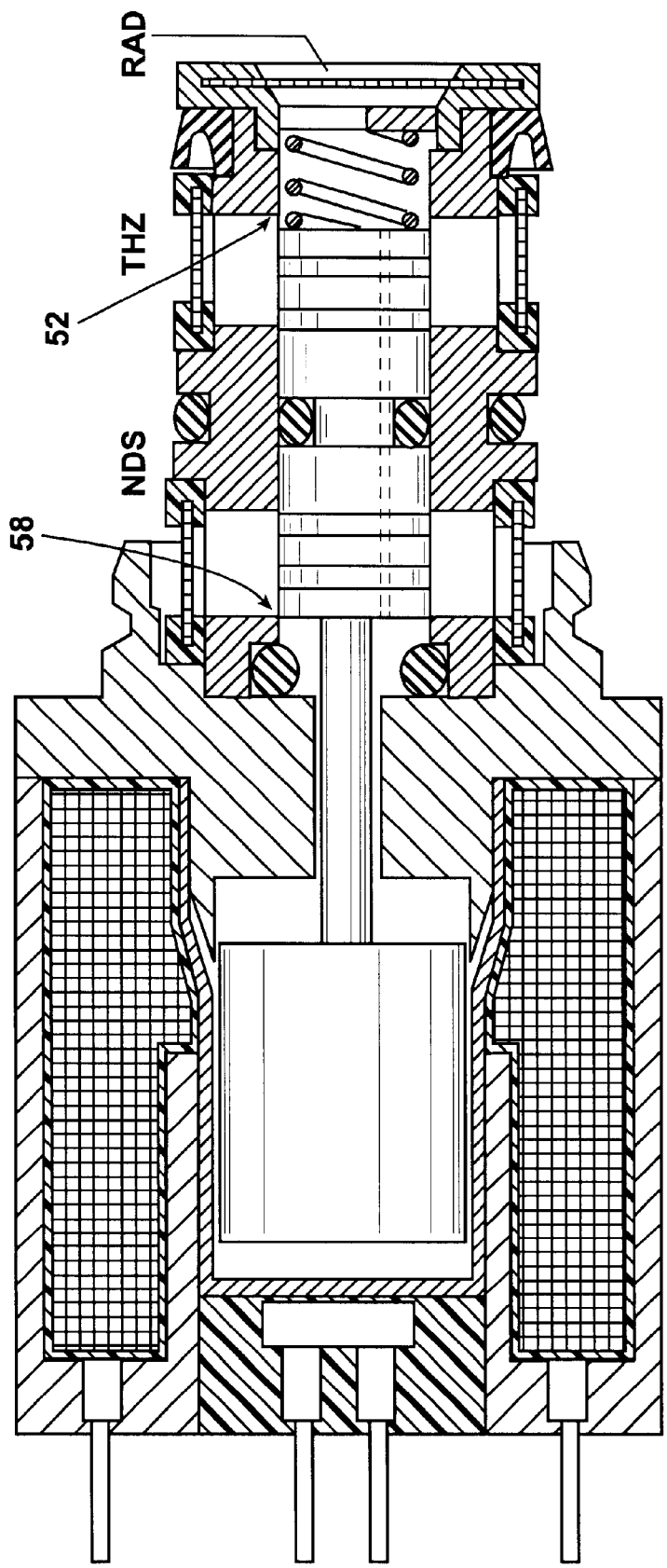
FIG. 3 is a cross-sectional view of the multi-way valve of the present invention as in FIG. 1 in the pressure-maintaining operation.

The embodiments of FIGS. 1 to 3 exhibit an electromagnetically actuatable multi-way valve 2 for slip-controlled hydraulic automotive vehicle brake systems in three different operating conditions. Reference numeral 4 designates a housing block in which an electromagnetic control device 6 is accommodated. The electromagnetic control device 6 comprises a coil 8 having connections 10 which extend outwardly on the front surface 12 of the housing block 4, as well as an armature 16 which is displaceable in a longitudinal direction 14 of the valve 2. A tappet rod 18 which is rigidly connected to a slide 20 extends from the armature 16 in the direction opposite to the front surface 12 of the housing block 4. Slide 10 includes a through-opening 21 which extends in the longitudinal direction 14.

On the side of the housing block 2 which is opposite in the longitudinal direction 14 of the front surface 12, a sleeve-shaped housing member 22 is adjoined pressure-tightly and accommodates the slide 20 so as to be slidable in the longitudinal direction 14. The sleeve-shaped housing member 22 has two radially extending openings 24, 26 each which are spaced from one another in the longitudinal direction 14 and in which one filter 28 or 30 each is arranged. The radial opening 24 provides a port for a high-pressure source (not shown in the Figures), for example, a tandem master cylinder of the brake system. The opening 26 provides a port for a low-pressure accumulator (likewise not shown). On the side of the sleeve-shaped housing member 22 remote from the housing block 4, the longitudinal opening 21 opens into a port 32 to which a connecting line to the wheel brake cylinder (not shown) is connectable.

The sleeve-shaped housing member 22 is sealingly accommodated in another housing block (not shown).

A spring 36 is arranged on the front surface 34 which is averted from the tappet 18 and faces the port 32 for the wheel brake. On one end, spring 36 is supported on a radially inwardly projecting step 38 and, on the other end, on the front surface 34 of the slide 20 to bias it in the longitudinal direction 14 towards the electromagnetic control device 6.

The slide 20 forms a seat valve 46 along with its front surface 40 facing the electromagnetic control device 6 and with an elastomeric annular element 42 which bears against the housing block 4 to provide a sealing seat 44.

The radially outward boundary of the front surface 34 of the slide 20 remote from the seat valve 46 provides a first control edge 48 which, together with a corresponding control edge 50 of the sleeve-shaped housing member 22, forms a first variable throttle cross-section 52 between the port 32 leading to the wheel brake and the radial opening 24 to the high-pressure source.

The slide 20 is configured as a hollow slide so that, by way of its opening 21, a pressure and flow communication is constituted between the portion adjacent to the wheel-brake-side front surface 34 of the slide 20 and the portion adjacent to an armature-side front surface 40 of the slide 20. The front surface 40 of the slide 20 provides radially outwardly a second control edge 54 (as can best be seen in FIG. 2) which, along with a corresponding control edge 56 of the housing member 22, forms a second variable throttle cross-section 58 between the low-pressure accumulator and the wheel brake which is variable by displacement of the slide 20 and can be opened or closed.

The multi-way valve is illustrated in the normal braking operation in FIG. 1. In the non-energized condition of the electromagnetic control device 6, the slide 20 adopts its first end position, biassed by the spring 36, where the throttle cross-section 52 between the wheel brake and the high-pressure source is opened to its maximum. The control edge 54 towards the low-pressure accumulator has overridden the control edge 56 so that the low-pressure accumulator is isolated from the wheel brake in terms of flow. To ensure a reliable sealing or isolation, the seat valve 46 is also closed, that means, the control edge 54 of the slide 20 is urged by the spring 36 against the elastomeric annular element 42 so as to provide sealing.

When a slip in relation to the road surface is detected by the brake controlling and regulating device on the associated wheel, the pressure in the wheel brake cylinder is reduced. FIG. 2 shows the slide position for the maximum pressure reduction. To this end, the electromagnetic control device 6 is energized and the armature is moved in the longitudinal direction 14 to the right in opposition to the spring 36 to adopt its second end position. This causes the slide 20 to move in the same direction and the seat valve 46 to open because the control edge 54 of the slide 20 is lifted from the elastomeric annular element 42 and the control edge 54 sweeps over the control edge 56 so that a progressively increasing throttle cross-section 58 between the low-pressure accumulator and the wheel brake side is opened. This permits hydraulic fluid to escape through the slide 20 and past the sealing seat 44 to the low-pressure accumulator for pressure reduction in the wheel brake cylinder. However, before the throttle cross-section 58 is opened, the wheel-side control edge 48 of the slide 2 will override the corresponding control edge 50 so that the high-pressure source is isolated. The throttle cross-section 58 to the low-pressure accumulator will open only afterwards.

FIG. 3 shows the multi-way valve 2 in a pressure-maintaining position. This position is achieved in a particularly favorable manner by a combination of pulse width modulation and pulse amplitude modulation of the control signals for the electromagnetic control device 6 because the armature 16 and, thus, tappet 18 and slide 20 are moved back so far in the direction of the normal braking position (FIG. 1), in relation to the position of FIG. 2, that the control edge 54 of the slide 20 on the side of the low-pressure accumulator just reaches or very slightly overlaps the corresponding control edge 56. In this slide position illustrated in FIG. 3, the wheel-side control edge 48 of the slide 20 is also in the area of its corresponding control edge 50. The pressure in the wheel brake can be reduced further or re-increased by a slightest movement of the slide 20 in the one or the other direction by a corresponding actuation of the electromagnetic control device 6. This makes available a precise volume dosing during ABS control operations without having to tolerate disturbing abutment noises of the armature due to a pulse width modulation due to differently long maximum opening times of the valve.

A slot-type seal which is produced and determined by the radial clearance between the slide 20 and the housing member 22 is made between the circumferential surface 60 of the slide 20, interrupted by circumferential grooves, and the housing member 22. However, the slot is shut off completely when the control edge 54 of the slide 20 bears against the elastomeric annular element 42, i.e., by closing of the seat valve 46. In addition, the multi-way valve 2 shown includes a contact seal 62 configured as another elastomeric annular element in an axial direction between the radial openings 24 and 26 to the high-pressure source or to the low-pressure accumulator which seal the slot between the slide 20 and the sleeve-shaped housing member 22.

What is claimed is:

1. A multi-way control valve for slip-controlled hydraulic automotive vehicle brake systems, for providing a flow connection between at least one wheel brake and a high-pressure source or a low-pressure accumulator by way of several ports on the multi-way control valve, comprising:

a slide guided in a sleeve-shaped housing member, the slide having a first control edge and providing, along with a corresponding control edge on the housing member, a first variable throttle cross-section in the hydraulic pressure fluid connection between the port of the high-pressure source and the port of the wheel brake, wherein the slide is biased in the direction of a first end position in which the port of the wheel brake is connected to the port of the high-pressure source in terms of flow and isolated from the port of the low-pressure accumulator in terms of flow, a valve residing between the port of the wheel brake and the port of the low-pressure accumulator which is closed in the normal braking operation and opened for pressure reduction in the wheel brake, a valve member which closes the valve between the port of the wheel brake and the port of the low-pressure accumulator is provided by the slide, wherein in its closed condition, said valve is configured as a seat valve, wherein both front surfaces of the slide are acted upon by hydraulic medium to which the pressure prevailing on the wheel brake is applied and wherein the hydraulic medium escapes to the port of the low-pressure accumulator when the seat valve is opened.

2. Multi-way control valve as claimed in claim 1, wherein the slide has a second control edge which provides, along with a corresponding second control edge on the housing member, a second variable throttle cross-section in the hydraulic connection between the ports of the wheel brake and the low-pressure accumulator.

3. Multi-way control valve as claimed in claim 1, wherein the first and the second control edges are so arranged that upon displacement of the slide in the direction of reducing the pressure at the port of the wheel brake, initially, the first flow cross-section is closed before the second flow cross-section is opened.

4. Multi-way control valve as claimed in claim 3, wherein the flow cross-sections limited by the control edges increase progressively when the slide movement is steady.

5. Multi-way control valve as claimed in claim 2, wherein the second control edge of the slide is configured on the front surface of the slide facing the sealing seat.

6. Multi-way control valve as claimed in claim 5, wherein the slide is urged with its second control edge against the sealing seat.

7. Multi-way control valve as claimed in 6, wherein the second control edge after its lifting from the sealing seat overlaps with the second control edge of the housing member and opens the second throttle cross-section only after having passed this second control edge.

8. Multi-way control valve as claimed in claim 6, wherein the sealing seat includes an elastomeric annular element on which the slide is movable into sealing abutment with its second control edge.

9. Multi-way control valve as claimed in claim 1, wherein a slide position of the slide can be determined by way of an electronic sensor device and is controllable by way of an electronic control device.

10. Multi-way control valve as claimed in claim 9, wherein the position sensor is positively or frictionally connected to a coil member of an electromagnetic control device and is connected to an electronic control unit (ECU).

11. Multi-way control valve as claimed claim 10, wherein the electromagnetic control device includes a proportional magnet.

12. Multi-way control valve as claimed in claim 1, further including a slot-type seal provided between the slide and the housing member.

13. Multi-way control valve as claimed in claim 12, wherein the slot is provided by the radial clearance between the slide and the housing member.

14. Multi-way control valve as claimed in claim 12, further including a contact seal.

15. Multi-way control valve as claimed in claim 14, wherein the contact seal is configured as a biased elastomeric seal.

* * * * *